United States Patent Office 2,754,222
Patented July 10, 1956

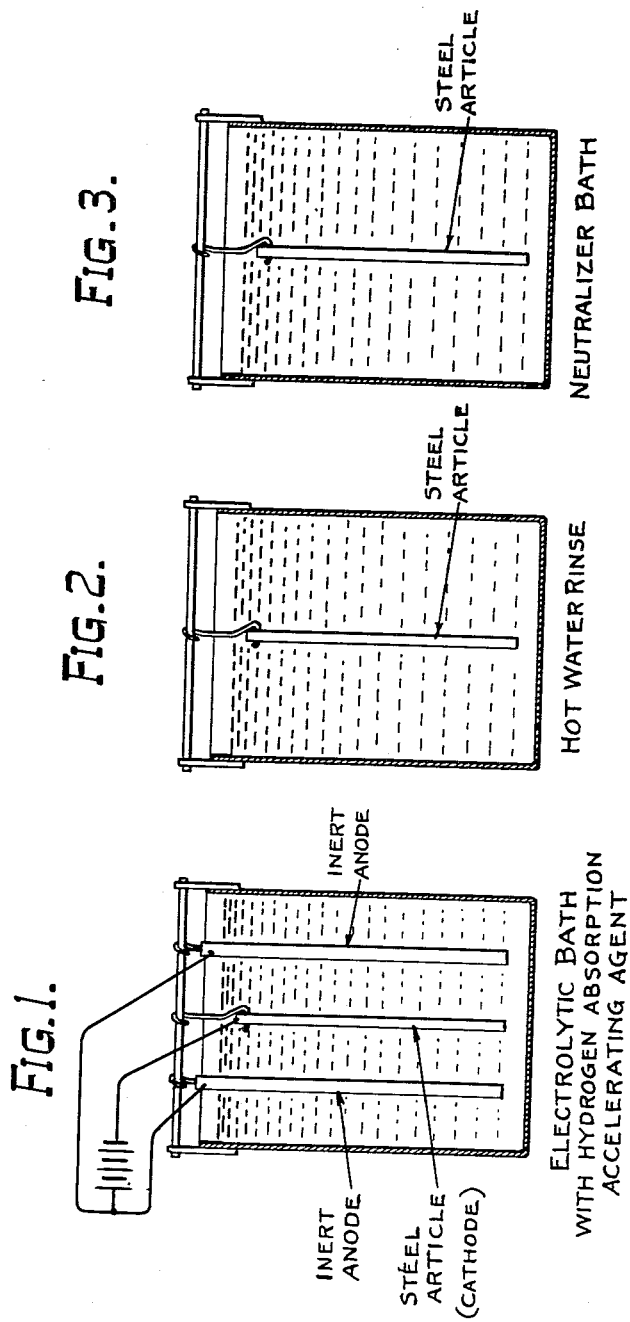

2,754,222
PREPARATION OF STEEL FOR GLASSING AND RESULTANT ARTICLE

James H. Healy and James D. Sullivan, Milwaukee, Wis., assignors to A. O. Smith Corporation, Milwaukee, Wis., a corporation of New York Application November 9, 1953, Serial No. 391,024

7 Claims. (Cl. 117—53)

This invention relates to a method of treating a metal surface in preparation for applying a corrosion-resistant coating thereto and more particularly to a method of treating steel in preparation for glassing and the resultant glass coated article. This application is a continuation-in-part of an application entitled "Preparation of Steel for Glassing," Serial No. 305,072, filed August 18, 1952, now abandoned.

Considerable difficulty has been encountered in the past when attempting to coat various types and thicknesses of steel with glass or vitreous enamel. The glass or vitreous enamel coating is subjected to fish scaling and reboiling defects which are attributed to hydrogen gas evolved in the coating application process.

To prevent fish scaling and reboiling resort has been made in the past to the use of expensive premium steels, to bubbly glass and atmosphere firing and to attempt to remove all sources of hydrogen encountered during the glass coating process.

The present invention it is believed takes a novel approach to the problem of eliminating fish scaling and reboiling in that hydrogen is used to advantage to solve the hydrogen problem that is believed to be the cause of the fish scaling and reboiling.

In general the invention consists in cathodically bombarding a steel article with atomic hydrogen in a bath containing a hydrogen absorption accelerating agent to increase the porosity of the steel, and thereafter removing a substantial portion of the hydrogen from the steel so that the hydrogen developed during firing of the glass coating may be received and stored within the porous steel to eliminate the build-up of hydrogen pressure beneath the coating.

The invention has been embodied in a process illustrated in the accompanying drawings and which constitutes the best mode presently contemplated of carrying out the invention.

In the drawings:

Figure 1 is a schematic view showing a steel article immersed in an electrolytic bath containing the hydrogen absorption accelerating agent;

Fig. 2 is a schematic view showing the steel article disposed in a hot water rinse;

Fig. 3 is a schematic view showing the steel article immersed in a neutralizer bath;

Figure 4:
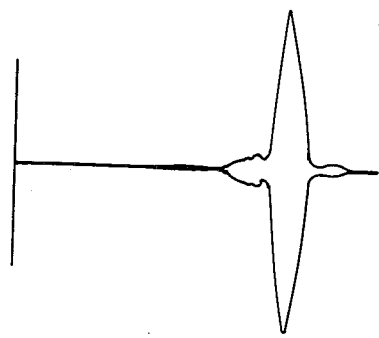
Fig. 4 is a reproduction of a reflectoscope pattern showing the reflection of ultrasonic vibrations by the back surface of an untreated steel article.

In carrying out the invention the steel is first cleaned to remove all the mill scale and foreign material from its surfaces to normally present a uniformly clean surface throughout. The cleaning operation can be accomplished by conventional acid pickling, by sand blasting or by, for example, cathodic pickling as is disclosed by Staley, Journal of American Ceramic Society, vol. 9, page 795. In some cases the cathodic pickling and the process of the invention may be carried out in the same bath which contains a hydrogen absorption accelerating agent as will be described hereinafter, although it has been found that hydrogen absorption accelerating agents adversely affect the removal of certain types of scale from the steel.

However, the usual procedure which is applicable to all steels is that after the cleaning is completed by whatever method is employed the steel or article to be glass coated is placed in an electrolytic bath containing a hydrogen absorption accelerating agent, as shown in Figure 1, wherein the steel is employed as the cathode and a generally insoluble element, such as graphite or platinum, is made the anode. The purpose of this treatment is to bombard the steel cathode with what is believed to be atomic and/or ionic hydrogen so as to increase the porosity of the steel by creating, enlarging or blowing up the voids or rifts that are formed or exist in the steel.

The hydrogen absorption accelerating agent is included in the bath to accelerate the penetration and absorption of the hydrogen atoms in the steel and takes the form of a compound derived from an element of group VA or VIA in the periodic table such as arsenic, selenium or antimony. Arsenic pentoxide, $AS_2O_5$, has been shown to be very effective in promoting penetration of hydrogen into the steel. The arsenic pentoxide should not be less than ten parts per million or not less than .001% of the bath or equivalent molar amounts. However, it has been noted that the length of time required for the treatment substantially increases and the efficiency of the process decreases as the concentration of the arsenic pentoxide is lowered below .025% by weight of the bath.

The temperature of the electrolytic bath is preferably maintained between about 150° and 200° F. to achieve the most effective hydrogen penetration and effective enlargement of the voids.

The electrolyte in the bath may consist of any compound which will disassociate in water and conduct an electric current and which will generate hydrogen at the cathode. Sulphuric acid, sodium hydroxide or sodium sulphate are compounds which may be employed as the electrolyte. It has been found that about a 7% solution, by weight, of sulphuric acid makes an extremely satisfactory electrolyte, for sulphuric acid is readily available and the electrolyte may be conveniently regenerated by the mere addition of water.

The time of immersion of the steel within the bath to obtain the necessary enlargement of the voids is dependent on the thickness, composition and structure of the steel employed and the nature and operating conditions of the electrolytic bath.

It is desirable to employ an insoluble anode, such as graphite or platinum, in the electrolytic circuit so that the anode material will not be plated on the steel cathode during operation of the electrolytic bath.

When an electric current is applied between the anode and cathode, hydrogen is generated at the cathode, i. e. the article being treated. The nascent hydrogen thus generated is believed to be in the atomic and/or ionic form, and as such possesses great penetrating power. This hydrogen penetrates the lattice structure of the steel to expand the same and is believed to accumulate within the voids, rifts or discontinuities in the steel where it recombines as hydrogen gas, $H_2$.

As the generation of hydrogen at the cathode continues, the pressure of the hydrogen gas accumulated within the voids increases the porosity of the steel by what is believed to be a blowing up or enlargement of the voids in the steel.

The term "void" as used in connection with the metallographic structure of steel has never been consistently defined in the metallurgical field, and thus "void" in the present description and claims is intended to mean a degree of porosity in the steel between the limits of an area of low electron density to a metallographical visible space in the steel.

The increase of porosity of the treated steel has been proven by several testing methods such as density measurements, ultrasonic vibration reflections, and metallurgical examinations of cross-sections of steel. For example, a density measurement of a given piece of untreated, as received, SAE 1015 steel was made and found to be 7.8748 grams per cc. This sample was placed in a 7% $H_2SO_4$ bath having an addition of 0.5 gram per liter of $As_2O_5$ and at a temperature of 160° F. and subjected to a current density of 18 amperes per square foot for a period of 15 minutes to effect a penetration of hydrogen into the steel. After the hydrogen treatment, the density of this sample was found to be 7.8703 grams per cc. thereby indicating a decrease in density or an increase in porosity of the steel due to the hydrogen treatment.

A second procedure employed to show the increase of porosity of the treated steel was that of ultrasonic testing. The results of these tests are shown in Figs. 4 through 7. Briefly the procedure consists of transmitting mechanical ultrasonic vibrations through the steel sheet as by a half inch angle, five megacycle crystal. The vibrations are reflected by the opposite or back edge or surface of the steel and the time interval between the impulse and the reflection is measured by an ultrasonic reflectoscope. However, when the steel contains an unusual number of discontinuities or voids, the ultrasonic impulses are also reflected by the surface surrounding these voids.

As the discontinuities are located between the surface wherein the ultrasonic impulse is introduced and the back end surface, the time interval between the impulse and the reflection from the surrounding surfaces of the voids will be less than the time interval for the back surface reflection of the steel itself and thus the reflection from the discontinuity will be recorded on the reflectoscope as a pip located forwardly of the pip indicating the back surface reflection.

To determine the effect of hydrogen penetration treatment on the structure of the steel, several pieces of SAE 1015 steel were sand blasted and introduced as the cathode into an electrolytic bath consisting of 7% $H_2SO_4$ and 0.5 gram per liter of $As_2O_5$ at a temperature of 160° F. A current density of 18 amperes per square foot was employed and the pieces were subjected to this bath for periods of 5, 10, and 15 minutes, respectively. The treated pieces were rinsed in boiling water for four minutes and neutralized for one minute in 2 grams per liter of sodium cyanide at 130° F.

An untreated piece of steel gave the pattern shown in Fig. 4. This pattern shows one major pip caused by the reflection of the ultrasonic vibration from the back edge or surface of the steel. This pip is known as a back edge reflection.

Figure 5:
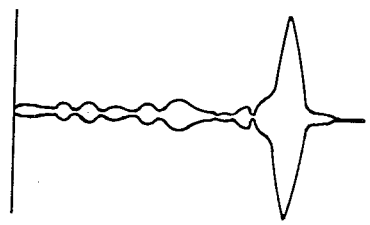
Fig. 5 is a reproduction similar to that of Fig. 4 showing the reflection pattern occurring in a steel article subjected to a hydrogen penetration treatment for five minutes.

The pattern given by the steel which was treated for five minutes is shown in Fig. 5. The small or rounded pips indicate that not all of the vibrations reached the back surface of the steel but that a portion of the vibrations instead were reflected by the surfaces surrounding the voids or discontinuities. The back edge reflection pip indicates that the back edge reflection of the steel is considerably smaller than the corresponding back surface reflection of the untreated steel shown in Fig. 4.

Figure 6:
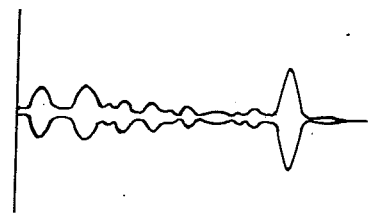
Fig. 6 is a reproduction similar to that of Fig. 5 showing the pattern after a ten minute treatment.

After treating the specimen for 10 minutes the pattern, as seen in Fig. 6, shows that the back edge reflection, is further reduced in size and indicates, by the increased size of the forward rounded pips, that the number and size of the voids or discontinuities have increased.

Figure 7:
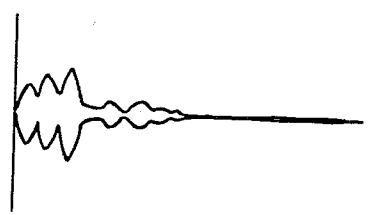
Fig. 7 is a reproduction similar to Fig. 5 showing the pattern after a fifteen minute treatment.

The pattern shown in Fig. 7, which represents a hydrogen treatment of 15 minutes, indicates that the discontinuities have increased in size to such a degree that the vibrations did not penetrate to the back edge of the steel and thus the large pip shown in Figs. 4, 5 and 6, indicating the back edge reflection, is no longer present. In this pattern the entire vibration is reflected by the voids or discontinuities adjacent to the front surface of the steel.

From these ultrasonic tests it is clearly indicated that the porosity of the steel is increased by the hydrogen penetration operation, or the existing discontiuities or voids are enlarged or new discontinuities are formed by the action of the hydrogen in the steel.

After the hydrogen bombardment is completed, the hydrogen gas accumulated within the steel during the electrolytic action should be removed without any considerable reduction of the size of the voids since if the hydrogen is not removed, the hydrogen would pass from the steel during firing of the glass coating that is to be fused thereon as hereinafter described, and cause excessive boiling in the glass. Under normal conditions the hydrogen will pass freely out of the steel to the atmosphere. However, this is a very lengthy process and the hydrogen is ordinarily removed by boiling water or other heat treatments.

Rinsing of the steel in boiling water is illustrated in Fig. 2 where the hot water bath there shown serves to remove hydrogen from the voids and rinses the excess electrolyte from the surface of the steel.

On completion of the water rinse when an acid is employed as the electrolyte, the steel is then placed in a neutralizing bath, shown in Fig. 3. The neutralizing bath may be made by the addition of small amounts of borax, sodium hydroxide or sodium cyanide to water. The temperature of the neutralizing bath is maintained from about 120° F. to about 200° F. It is necessary to remove all traces of the acid so as to prevent corrosion of the steel before the same is glass coated. Corrosion by the acid occurs very rapidly so it is desirable to completely remove all traces of the acid from the surface of the steel.

With the hydrogen gas substantially removed from the steel, the steel may then be coated with a glass or vitreous enamel composition by any of the conventional processes. After coating, the steel is fired at an elevated temperature of about 1200° F. to 1600° F. to fuse the glass coating to the steel. The particular firing temperature within the 1200° F. to 1600° F. range depends on the sag resistance of the steel to which the glass is applied.

During the firing, water from a number of previously mentioned sources reacts with the iron to form atomic hydrogen which penetrates the steel and is dissolved therein.

After firing, as the steel is cooled, the dissolved atomic hydrogen, which is more soluble in steel at high temperatures than at low temperatures, tends to pass out of solution from the steel and accumulate as molecular hydrogen within the voids. As the voids are believed to have been substantially enlarged by the electrolytic hydrogen penetration, the hydrogen gas which collects within the enlarged voids has ample room into which to expand and therefore no damaging pressure is exerted by the gas beneath the hardened glass coating. As there is no excessive pressure exerted by the hydrogen gas beneath the coating, there is no tendency for the coating to pop off as fish scales or to reboil on subsequent firing.

With the use of the present invention premium steel and bubbly glass structures are not required because of the increase in the porosity of the steel by hydrogen penetration. Therefore hot rolled, cold rolled, killed, semi-killed, and rimmed steel and steels of considerable range of carbon content may all successfully be glass coated with the present process. This factor enables the cheaper non-premium steels to be coated. With the present invention, steel having increased strength and improved physical properties may be coated and this opens up the glass coating field to a wide variety of products which heretofore had not been susceptible to coating because of the restrictive nature of the steel to which a coating could be successfully applied. For example, heretofore enameling iron, which is a substantially pure iron having a carbon content of .01% to .03%, has been generally exclusively employed as the base for glass coatings because the higher carbon steels cause fish scaling and reboiling of the coating. However, with the use of the present invention higher carbon steels can be successfully glass coated without evidence of fish scaling or reboiling defects in the coating. Not only are the higher carbon steels considerably less expensive than the enameling iron, but the higher carbon steels generally have increased physical properties which increase the variety of products which can be enameled or glass coated.

Since the process of the invention eliminates the need for hydrogen defect control in the design of the glass coating composition it makes possible the use of a non-bubble type of glass for a ground coat on the steel. In addition, as there are no appreciable bubbles or voids in the substantially non-bubbly glass, a thinner coating may be employed, as compared to the bubbly type, without reducing the effective corrosion resistance of the coating.

Various modes of carrying out the invention are contemplated as within the scope of the following claims particularly pointing out and distinctly claiming the subject matter which is regarded as the invention.

We claim:

1. In a method of coating steel for glassing, said steel being initially coated with a non-uniform coating of mill scale and foreign matter, the steps comprising cleaning the steel to be glassed to provide a uniformly clean surface on the steel, making the steel the cathode in an electrolytic circuit established in a bath containing arsenic pentoxide in an amount not less than .001% of the bath, applying an electric current to said circuit to generate hydrogen at said cathode, said hydrogen penetrating the cleaned surface of the steel uniformly throughout under the action of the electric current and the arsenic pentoxide operating as a hydrogen absorption accelerating agent and entering the voids in said steel and exerting pressure within the voids to increase the size of the same, removing said steel from the circuit, heating the steel to substantially completely remove the hydrogen from the steel, thereafter subjecting said steel to a neutralizing bath maintained at a temperature from about 120° F. to 200° F. to remove any traces of acid remaining on the steel, and then applying a glass composition to the steel and fusing said composition thereto, the hydrogen subsequently formed during fusion being free during cooling to pass into said voids and eliminate the build-up of excess pressure beneath the glass coating.

2. In a method of glass coating steel, the steps comprising electrolytically penetrating hydrogen into the steel in a bath containing a hydrogen absorption accelerating agent to substantially accelerate absorption of hydrogen by the steel above the rate of hydrogen penetration encountered in an electrolytic bath under cathodic pickling conditions and permanently increase the porosity thereof as evidenced by the change in back edge reflections of ultrasonic vibrations transmitted through the steel by a half-inch angle five megacycle crystal, removing substantially completely all of the hydrogen from the steel, applying a non-bubbly type coating of a glass composition to the steel, and firing the coated steel at an elevated temperature to fuse the coating to the steel with the hydrogen formed during firing being free to expand into the porous steel during cooling and eliminate fish scaling of the coating.

3. In a process for coating steel with a glass composition fused to the steel by firing the glass at an elevated temperature, the steps comprising subjecting the steel that is to be glass coated to an electrolytic bath containing a hydrogen absorption accelerating compound of a metal selected from the group consisting of arsenic, selenium and antimony with the amount of said metal in the bath being equivalent in action to not less than the amount of arsenic contained in a .001% by weight of a solution of arsenic pentoxide and in a maximum concentration preventing development of defects in the glass coating fused to the steel, penetrating hydrogen into said steel by an external current applied to said bath with said hydrogen penetration being accelerated by said compound and continuing the hydrogen treatment until the lattice structure of the steel is increased and the density thereof is decreased, thereafter removing hydrogen from the steel to reduce the hydrogen pressure in the steel below the pressure of the hydrogen subsequently formed at the glass coated surface of the steel during firing of the glass to enable the subsequently formed hydrogen to expand into said steel during cooling, coating the steel with the glass composition, and firing the steel at an elevated temperature to fuse the glass to the steel with the hydrogen produced by the chemical reactions during firing passing into the lattice structure of the steel upon cooling of the steel to thereby prevent the build-up of hydrogen pressure beneath the coating.

4. In a method of coating steel by a glass composition fused to the steel by firing the glass at an elevated temperature, the steps comprising locating the steel in an electrolytic bath containing arsenic pentoxide in an amount not less than .001% by weight of the bath and in a maximum concentration preventing development of defects in the glass fused to the steel, making the steel the cathode in an electrolytic circuit, said circuit having a substantially inert anode and an electrolyte with said arsenic pentoxide increasing the rate of absorption of said hydrogen in the steel, applying an electric current to said circuit to generate hydrogen at the cathode with the hydrogen penetrating into the steel to increase the porosity thereof, removing said steel from the circuit, applying heat to said steel to remove a sufficient amount of the hydrogen from the steel to reduce the hydrogen pressure in the steel below the pressure of the hydrogen subsequently formed at the glass coated surface of the steel during firing of the glass to enable the subsequently formed hydrogen to more readily expand into said steel during cooling, coating said steel with the glass composition, and firing the steel at an elevated temperature to fuse the glass to the steel with the hydrogen produced between the steel surface and the glass by chemical reaction of the glass and steel during firing passing into the porous structure of the steel to thereby eliminate the build-up of excessive pressure beneath the glass coating.

5. In a method of coating steel with a glass composition fused to the steel by fusing the glass at an elevated temperature, the steps comprising subjecting the steel that is to be glass coated to an electrolytic bath containing a hydrogen absorption accelerating element selected from the group consisting of Group VA and Group VIA of the Periodic Table of Elements with the amount of said element in the bath being equivalent in action to not less than the amount of arsenic contained in a .001% by weight of a solution of arsenic pentoxide and in a maximum concentration preventing development of defects in the glass fused to the steel, penetrating hydrogen into said steel by an external current applied to said bath with said hydrogen penetration being accelerated by said element and continuing the hydrogen treatment until the lattice structure of the steel is increased and enlarged and the density of the steel is decreased, thereafter removing hydrogen from the steel to reduce the hydrogen pressure in the steel below the pressure of the hydrogen subsequently formed at the glass coated surface of the steel during firing of the glass to enable the subsequently formed hydrogen to expand into said steel during cooling, coating the steel with the glass composition, and firing the steel at an elevated temperature to fuse the glass to the steel with the hydrogen produced by the chemical reactions during firing passing into the lattice structure of the steel upon cooling of the steel to thereby prevent the build-up of hydrogen pressure beneath the coating.

6. In a method of glass coating steel, the steps comprising penetrating hydrogen into the steel in an amount sufficient to permanently increase the porosity of the steel as evidenced by the change in back edge reflections of ultrasonic vibrations transmitted through the steel by a half-inch angle five megacycle crystal, removing the hydrogen from the steel, applying a coating of a non-bubbly glass composition to the steel, and firing the coated steel at an elevated temperature to fuse the coating to the steel with the hydrogen formed during firing being free to expand into the porous steel during cooling and eliminate fish scaling of the coating.

7. A steel article of manufacture having an outer surface finished to be covered with a glass coating, substantially the entire area of the steel of said article underneath said finished surface having interspaced voids of a size and number of interfere with the normal back edge reflection of the article by ultrasonic vibrations, and a non-bubbly type glass coating fused to the finished surface of the article, said voids receiving and storing hydrogen generated during the fusing of the glass to the steel to eliminate fish scaling and reboiling of the glass by said hydrogen.

References Cited in the file of this patent

Stayley: American Ceramic Soc. Jour., vol. 9 (1926), page 795.

"Journal of the Iron and Steel Institute," vol. 147 (1943), page 139P, paper by Stuart et al.